Nov. 11, 1930.  L. G. P. THRING  1,781,560
TORSION METER
Filed Dec. 11, 1928  2 Sheets-Sheet 1
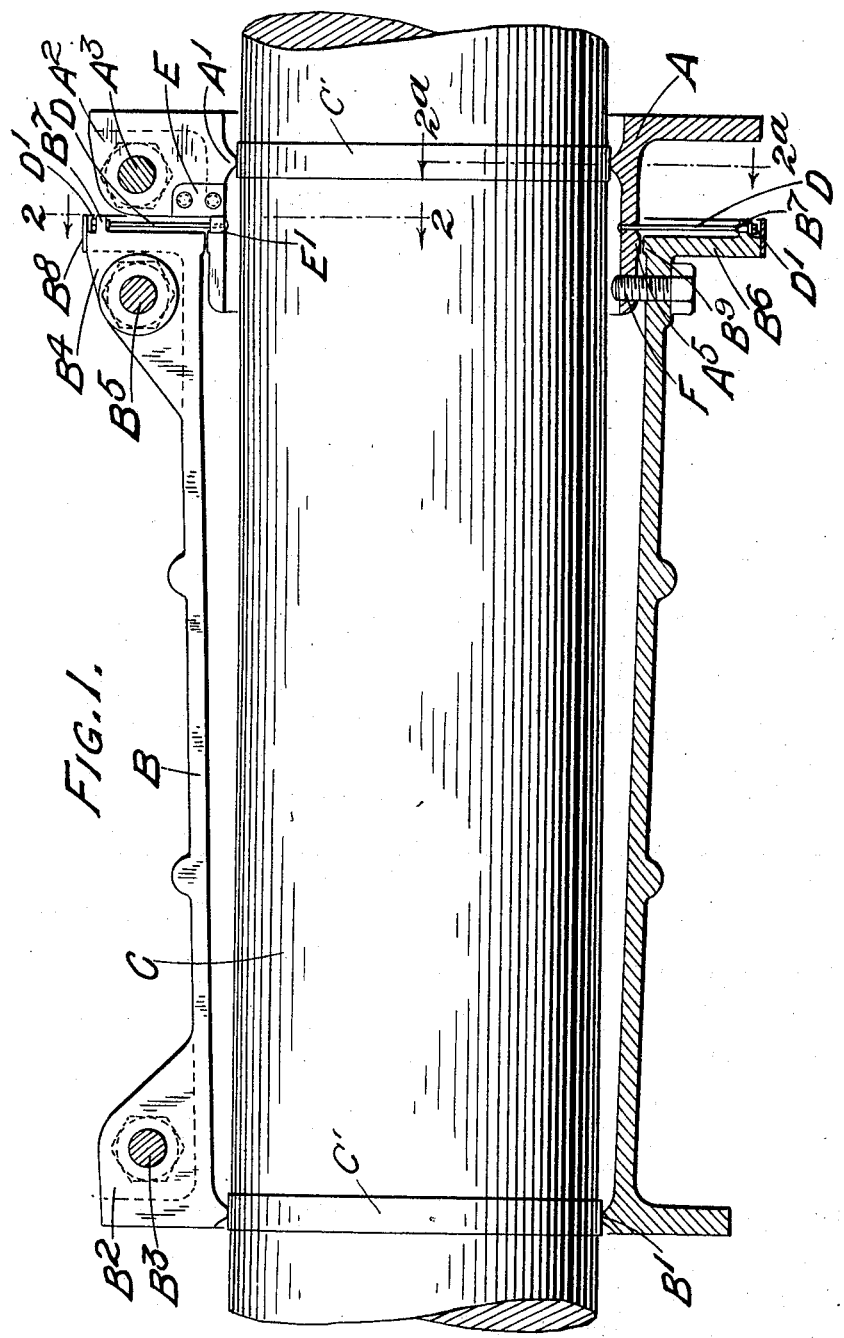

Nov. 11, 1930.  L. G. P. THRING  1,781,560
TORSION METER
Filed Dec. 11, 1928  2 Sheets-Sheet 2
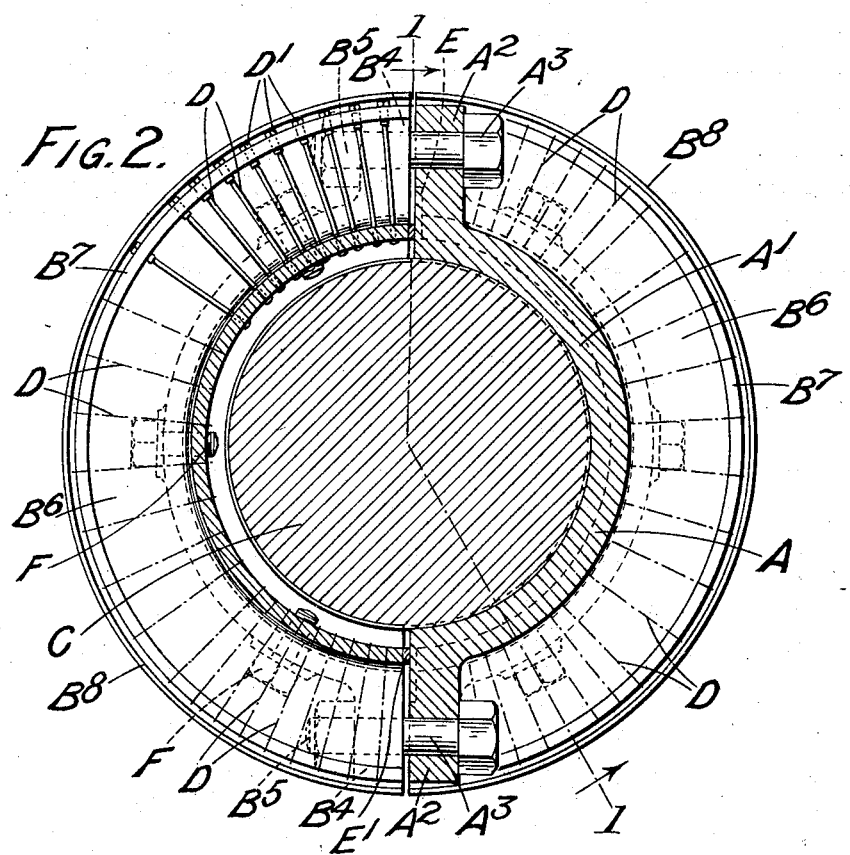
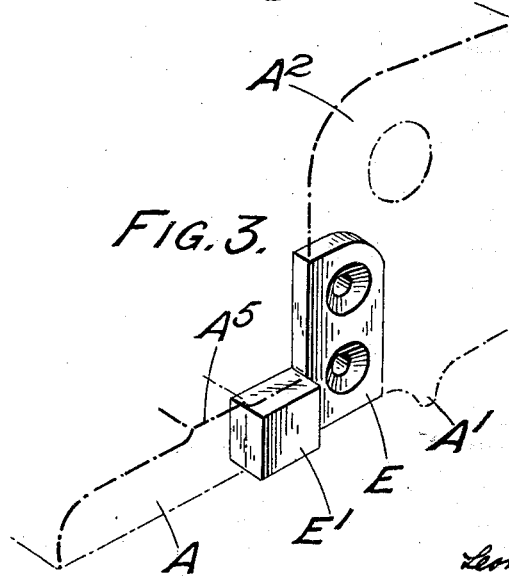

Patented Nov. 11, 1930

1,781,560

UNITED STATES PATENT OFFICE

LEONARD GODFREY PINNEY THRING, OF CAMBRIDGE, ENGLAND

TORSION METER

Application filed December 11, 1928, Serial No. 325,180, and in Great Britain December 17, 1927.

This invention relates to torsion meters or instruments for measuring the power being transmitted by a revolving shaft, of the kind in which the body portion of the torsion meter comprises two tubular members adapted to be clamped to the shaft respectively at points a suitable distance apart and so formed that portions thereof lie concentrically, the torsion being measured by mechanism actuated in accordance with the relative rotary movement between the two members.

In such torsion meters it has previously been customary to maintain the adjacent parts of the two members concentric while permitting the desired relative rotary motion between these members by means of a suitable bearing between the two parts or by providing three or more radially arranged metal strips one end of each of which was clamped to one of the members and the other end to the other member, these strips being arranged with their longer transverse dimension parallel with the axis of the shaft. Difficulty has, however, been experienced with such arrangements either from wear of the bearing or from the tendency for the strips to crack and break, and moreover, since only a few of such strips at the most were provided, the failure of one strip caused the whole apparatus to be thrown out of adjustment.

The object of the present invention is to provide an improved torsion meter of the above general type which will overcome these difficulties in a simple and effective manner.

According to the present invention instead of providing strips as above described for maintaining the adjacent parts of the two members constituting the body of the torsion meter in alignment, a series of radial wire suspension rods or spokes are provided forming an operative connection between these parts. Conveniently, each spoke is connected at one end to one of the members and screwthreaded at its other end to receive a suitable screwthreaded nut or the like acting on the other member so that the rods are readily adjustable in tension and constitute an operative connection between the adjacent ends of the two members.

Such suspension rods are not only less liable to fracture than the strips hitherto employed but, further, owing to the relatively large number of rods employed, even if one or two rods should fracture, the setting of the device is only thrown out a very small amount and is not completely upset as is the case if one of the strips hitherto employed should break.

Preferably one of the members constituting the body of the torsion meter is relatively short, while the other member is extended towards it from its point of connection to the shaft so that the free end of the extended member lies adjacent to the short member or collar, the suspension rods thus serving to support the free end of the second member from the collar in the desired manner. The two members are conveniently each formed in two substantially semi-cylindrical parts adapted to be clamped about the shaft, the shorter member or collar being usually that to which the inner ends of the spokes are connected. The abutting faces of the two halves of the collar member are conveniently provided, substantially in the plane of the spokes, with raised portions which come into contact when the two parts are brought together before the clamping screws are tightened and thus serve to determine the effective diameter of this part of the complete member so that this diameter will be the same although the device is applied to shafts the diameters of which differ slightly. Consequently, variations in the tension of the suspension rods when the clamping screws are tightened will be prevented.

The two members constituting the body of the torsion meter conveniently overlap slightly so that a portion of one lies within the other and in this case one or both of these concentric parts is preferably provided with two or more radial screwthreaded holes each positioned so as to register with a corresponding hole in the other part through which a bolt can be inserted so as to engage the corresponding hole in the other part and serve to position the parts of the apparatus positively while it is being set up.

The invention may be carried into practice in various ways but one construction of a torsion meter body according to this invention is illustrated by way of example in the accompanying drawings, in which Figure 1 is a sectional side elevation on the line 1—1 of Figure 2, Figure 2 is a section as to its lefthand part on the line 2—2 of Figure 1 and as to its righthand part on the line $2^a$—$2^a$ of Figure 1, and Figure 3 shows a constructional detail in perspective.

In the construction illustrated the torsion meter body comprises two tubular members A and B adapted to surround a shaft C the torsion in which is to be measured and to grip this shaft respectively at points a suitable distance apart, the torsion being measured by the relative rotary movement between the members A and B. Conveniently a protective metal ring $C^1$ is interposed between each gripping ring $A^1$, $B^1$ and the shaft to prevent damage of the shaft by such gripping rings.

Thus the members A and B are each formed in two substantially semi-cylindrical parts; the member A, which as shown is relatively short, being provided with an internal gripping ring or rib $A^1$ to engage the shaft C and with lugs $A^2$ through which pass clamping bolts $A^3$ for clamping the two parts of the member together, while the part B which is of longer tubular form is provided with a similar gripping ring or rib $B^1$ adjacent to its end remote from the member A and has lugs $B^2$ through which pass bolts $B^3$ for clamping the two parts thereof together.

The member B is extended from the point where the ring $B^1$ grips the shaft C towards the member A so that the free end of the member B lies adjacent to and surrounds the adjacent end of the member A as shown, this end of the member B being provided with additional lugs $B^4$ through which pass bolts $B^5$ for clamping the two parts of this member together at this end.

The free end of the member B is provided adjacent to the member A with a radial flange $B^6$ having an annular rib $B^7$ on its face. Formed in the portion of the member A which lies in the same transverse plane as the rib $B^7$ are a series of holes adapted to receive the inner ends of a series of supporting rods D, the outer ends of which pass through corresponding holes in the rib $B^7$ and are provided with nuts $D^1$ acting on the outer circumferential face of the rib $B^7$ so that the rods D serve to support the free end of the member B from the member A. A guard ring $B^8$ surrounds the flange $B^6$ as shown so as to prevent danger due to the outer end of a rod being thrown outwards in the event of a rod breaking, this ring being formed for example of resilient material so as to grip the flange $B^6$ and be retained in position thereon by friction.

Concentric internal and external parts respectively of the members A and B are machined as indicated at $A^5$, $B^9$ so as to form surfaces between which feeler gauges can be inserted when setting up the apparatus so as to ensure that the two parts A and B are concentric.

Since the diameters of the shafts to which the torsion meter body may be applied may vary slightly, it is desirable that means be provided for definitely determining the diameter of the member A in the plane of the suspension rods D and of the surfaces $A^5$, $B^9$ so that the diameter in these planes shall remain substantially the same when the clamping screws are tightened, and in spite of slight variations in the diameter of the shafts to which the apparatus may be applied. To this end, distance pieces E are provided between the abutting surfaces of the two halves of the member A having parts $E^1$ which lie in the plane of the rods. Such distance pieces are preferably detachable as shown in the drawings wherein each of these distance pieces comprises a plate-like part E which is let into the surface of the member A as shown and has the projection $E^1$ thereon which extends beyond this surface and prevents the abutting surfaces of the two halves of the member A from being drawn quite into contact in this plane and thus definitely determines the diameter of this part of the member A irrespective of any slight variations in the diameter of the part in the plane of the ring $A^1$ which may result from the tightening of the bolts $A^3$ or from variations in the diameter of the shaft to which the apparatus is applied.

The clamping bolts $A^3$ are enabled to draw the clamping rings $A^1$ into contact with the shaft C owing to the fact that these bolts lie between the clamping plane and the plane of the parts $E^1$.

The number and arrangement of the suspension rods D may vary. In the construction shown, however, the connection between the members A and B is made more rigid in the plane of the flanges $B^4$ than in a direction at right angles to this plane by employing rods spaced at smaller intervals in the neighbourhood of the said flanges. This arrangement is convenient when the mirror or other means for indicating the torsion are mounted at a point which is angularly displaced by approximately ninety degrees from each of the flanges $B^4$.

Provided in each half of the member A where it extends within the member B are three radial screwthreaded holes each registering with a corresponding screwthreaded hole in the surrounding portion of the member B through which a bolt F can be passed as shown, these bolts F serving to position the free end of the member B positively during setting up of the apparatus and only being removed when the apparatus is to be used.

The relative rotation between the members A and B may be measured in various ways, for example optically or electromagnetically. Since however, such methods of measurement are known per se and do not form any part of the present invention it is not thought necessary to illustrate them or describe them in detail.

It will be seen that with a torsion meter body as above described the free end of the member B will be effectively supported from the member A while the suspension rods D being radial, will permit the required small relative rotational movement between the members A and B to take place. Further, these wire rods will be less liable to fracture than the metal strips hitherto employed; while, even if several of such rods should break only a small error in the setting of the apparatus will take place.

It is to be understood that the apparatus is not limited to the details of construction described but that these may be varied within wide limits without departing from this invention.

What I claim as my invention and desire to secure by Letters Patent is:—

1. A torsion meter including in combination two tubular members parts of which lie adjacent, means for securing these members respectively to a shaft at points spaced apart along the shaft whereby torsion in the shaft will produce proportional relative displacement of said members, and a series of radial wire suspension rods connecting the adjacent parts of the two members.

2. A torsion meter including in combination two tubular members parts of which lie adjacent, means for fixing these members respectively on a shaft at points spaced apart along the shaft whereby torsion in the shaft will produce proportional relative displacement of said members, a series of radial wire suspension rods extending between adjacent parts of the two members, means for connecting one end of each suspension rod to one of the members, and a nut member engaging the other end of each rod and bearing on a part of the other member.

3. A torsion meter including in combination two tubular members parts of which lie adjacent, said adjacent parts being apertured, means for fixing these members respectively on a shaft at points spaced apart along the shaft whereby torsion in the shaft will produce proportional relative displacement of said members, a series of radial wire suspension rods extending between and passing through the apertures in the adjacent parts of the two members, a head member on one end of each rod bearing against one member, and a nut member engaging the other end of each rod and bearing on the other member.

4. A torsion meter including in combination two tubular members parts of which lie adjacent, each of these members comprising two substantially semi-cylindrical parts, means for clamping these parts together about a shaft whereby torsion in the shaft will produce proportional relative displacement of said members, a projecting rib extending circumferentially within each member adapted to engage and grip the shaft when the two parts of the member are clamped together about that shaft, the internal ribs of the two members respectively being spaced apart along the shaft, and a series of radial wire suspension rods forming an operative connection between adjacent parts of the two members.

5. A torsion meter including in combination two tubular members, part of one of which lies within a part of the other, each of these members comprising two substantially semi-cylindrical parts, means for clamping these two parts together about a shaft whereby torsion in the shaft will produce proportional relative displacement of said members, a projecting rib extending circumferentially within each member adapted to engage and grip the shaft when the two parts of the member are clamped together about that shaft, the internal ribs of the two members respectively being spaced apart along the shaft, a series of radial wire suspension rods connecting the two members, these rods lying in a plane which is displaced longitudinally from the internal gripping rib on the inner member, and raised portions on the abutting faces of the two halves of the inner member disposed substantially in the plane of the suspension rods and adapted to come into contact when the two parts of this member are brought together before the clamping means are tightened so as to determine definitely the effective diameter of the inner member in the plane of the rods as set forth.

6. A torsion meter including in combination two tubular members one end of each being adjacent and concentric with the corresponding end of the other, means for fixing these members respectively on a shaft at points spaced apart along the shaft whereby torsion in the shaft will produce proportional relative displacement of said members, a series of radial wire suspension rods connecting adjacent parts of the two members and corresponding screwthreaded holes in the concentric parts of the two members adapted to receive bolts which serve to position the parts of the apparatus positively while it is being set up.

7. A torsion meter including in combination two tubular members one end of each being adjacent and concentric with the corresponding end of the other, means for fixing these members respectively on a shaft at points spaced apart along the shaft whereby torsion in the shaft will produce proportional relative displacement of said members, a series of radial wire suspension rods connecting the adjacent parts of the two members, and opposed machined faces on the concentric parts of the two members between which a gauge can be inserted to test for true concentricity.

8. A torsion meter including in combination two tubular members one end of each being adjacent and concentric with the corresponding end of the other, means for fixing these members respectively to a shaft at points spaced apart along the shaft whereby torsion in the shaft will produce proportional relative displacement of said members, an external flange on the end of one member which lies adjacent to and surrounds the adjacent end of the other member, an annular rib on the face of this flange having a series of radial holes therein, a series of radial wire suspension rods the outer ends of which pass through these holes while their inner ends pass through corresponding holes in the other member, head members on the inner ends of the suspension rods, and a screwthreaded nut member on the outer end of each rod bearing on the annular rib.

9. A torsion meter including in combination two tubular members one end of each being adjacent and concentric with the corresponding end of the other, each of these members comprising two substantially semicylindrical parts, means for clamping parts of each member together about a shaft whereby torsion in the shaft will produce proportional relative displacement of said members, a projecting rib extending circumferentially within each member adapted to engage and grip the shaft when the two parts of the member are clamped together about that shaft, the internal ribs respectively on the two members being spaced apart along the shaft, an external flange on the end of one member which lies adjacent to and surrounds the adjacent end of the other member, an annular rib on the face of this external flange having a series of radial holes therein, a series of radial wire suspension rods the outer ends of which pass through these holes while their inner ends pass through corresponding holes in the other member, head members on the inner ends of the suspension rods and a screwthreaded nut member on the outer end of each rod bearing on the annular rib.

10. A torsion meter including in combination two tubular members one end of each being adjacent and concentric with the corresponding end of the other, each of these members comprising two substantially semicylindrical parts, means for clamping parts of each member together about a shaft whereby torsion in the shaft will produce proportional relative displacement of said members, a projecting rib extending circumferentially within each member adapted to engage and grip the shaft when the two parts of the member are clamped together about that shaft, the internal ribs respectively on the two members being spaced apart along the shaft, a series of radial wire suspension rods connecting the adjacent parts of the two members, and corresponding holes in the concentric parts of the two members adapted to receive bolts which serve to position the parts of the apparatus positively while it is being set up.

11. A torsion meter including in combination two tubular members one end of each being adjacent and concentric with the corresponding end of the other, each of these members comprising two substantially semicylindrical parts, means for clamping parts of each member together about a shaft whereby torsion in the shaft will produce proportional relative displacement of said members, a projecting rib extending circumferentially within each member adapted to engage and grip the shaft when the two parts of the member are clamped together about it, the internal ribs respectively on the two members being spaced apart along the shaft, a series of radial wire suspension rods passing through holes in the adjacent parts of the two members, a head member on one end of each suspension rod bearing against one member, a screwthreaded nut member engaging the other end of each rod and bearing on the other member, and opposed machined faces on the concentric parts of the two members between which a gauge can be inserted to test for true concentricity.

In testimony whereof I have signed my name to this specification.

LEONARD GODFREY PINNEY THRING.